Aug. 31, 1926.
J. A. LENTZ
1,598,535
ADJUSTABLE PLANE ARTICULATOR
Filed April 22, 1924    5 Sheets-Sheet 3
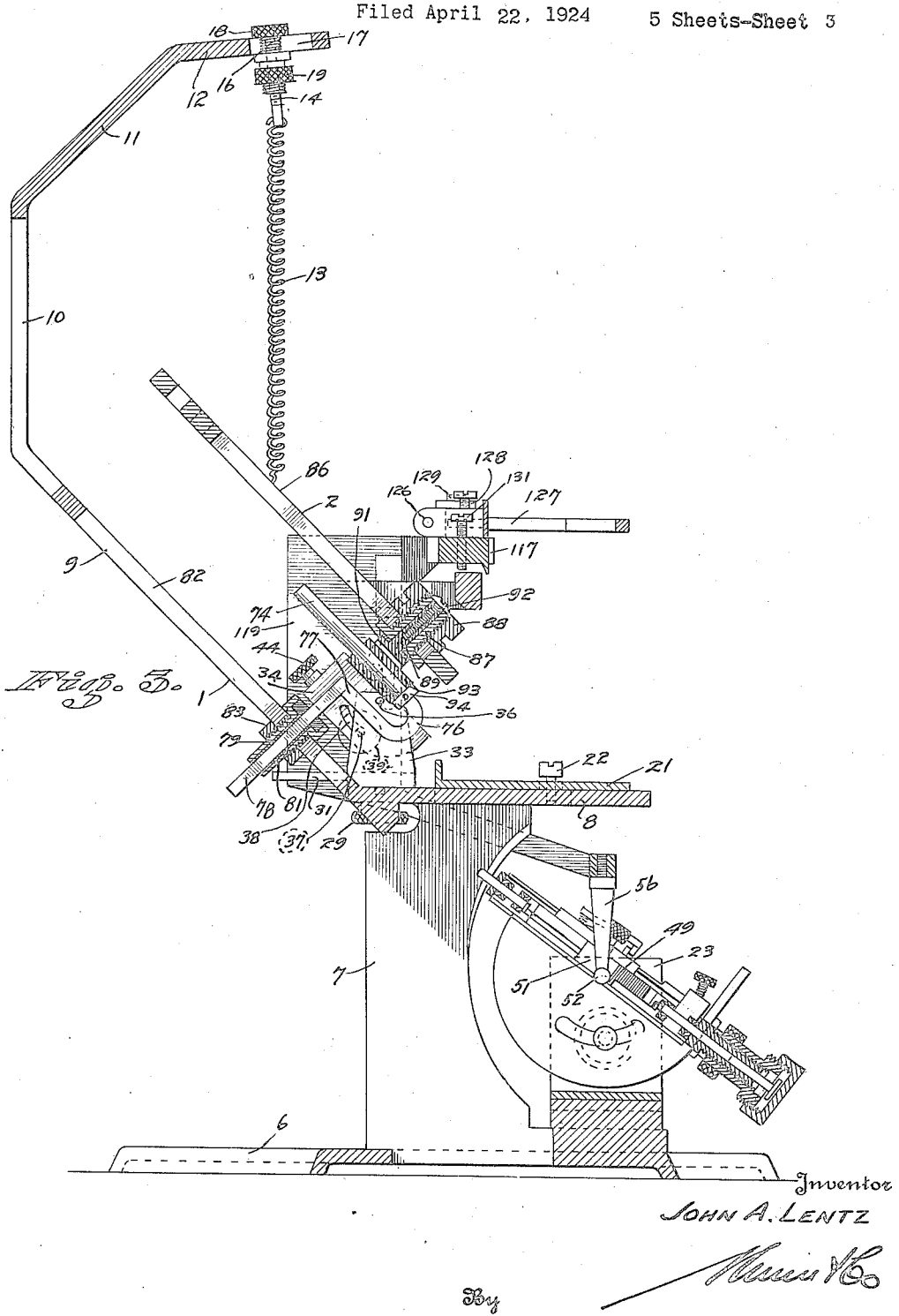
Inventor
JOHN A. LENTZ
By
Attorneys

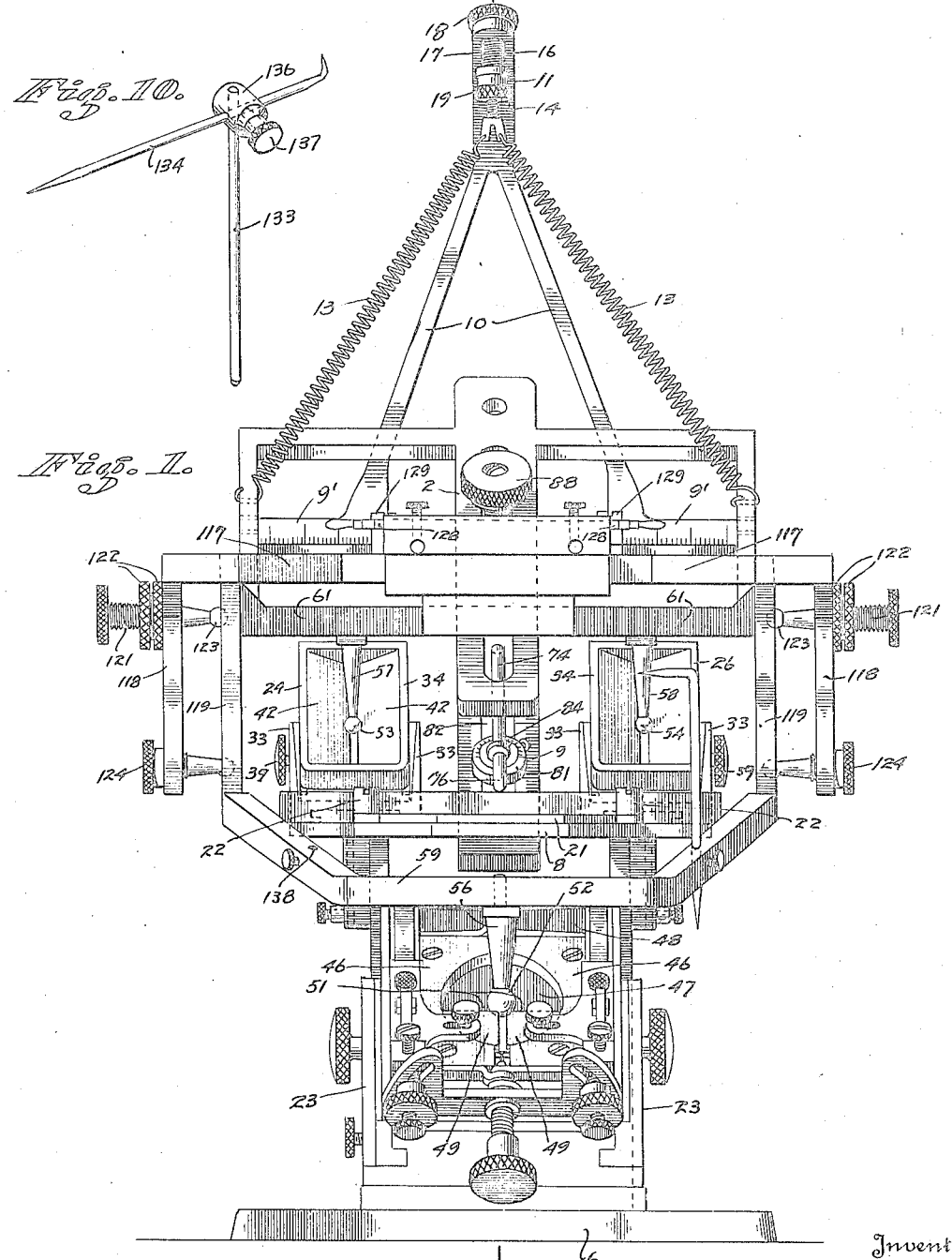

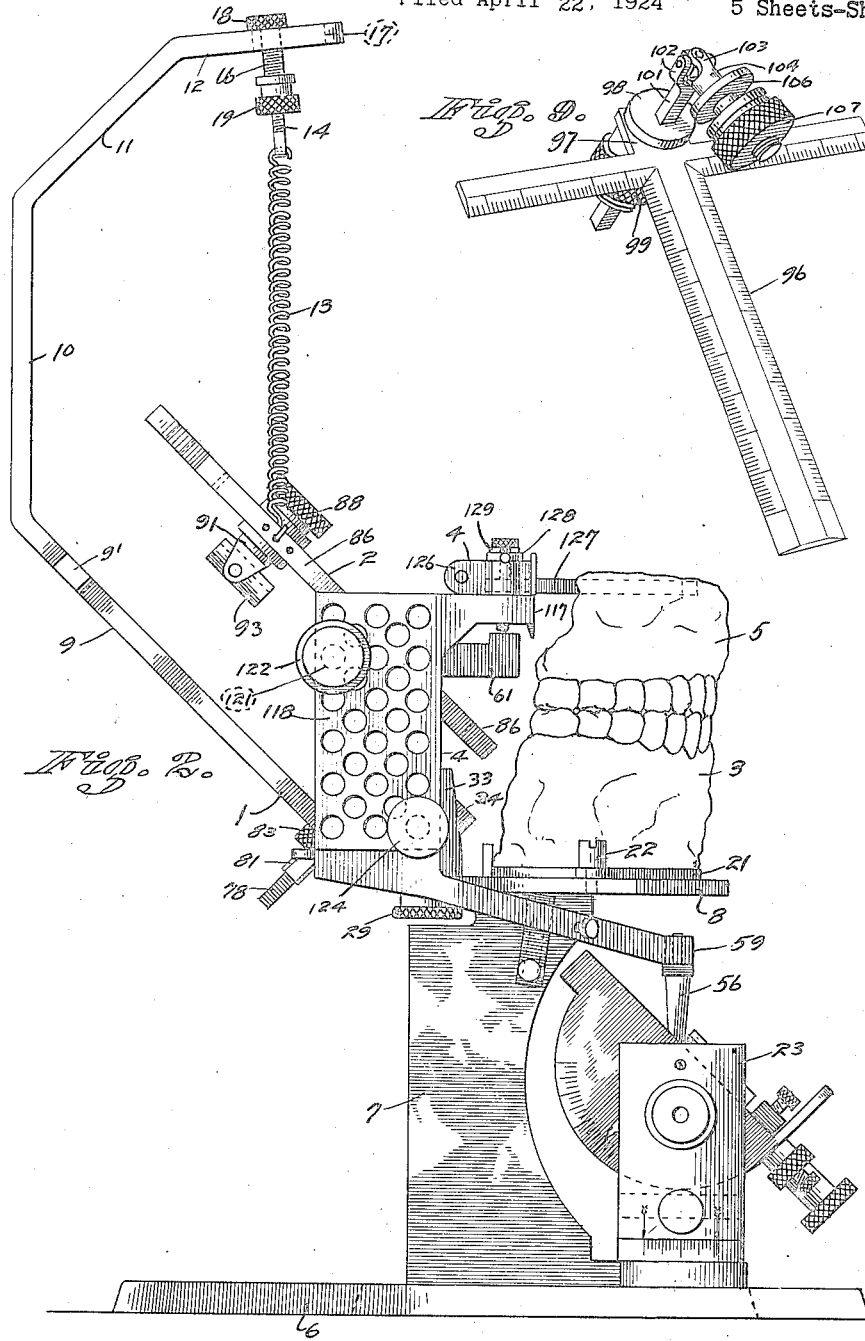

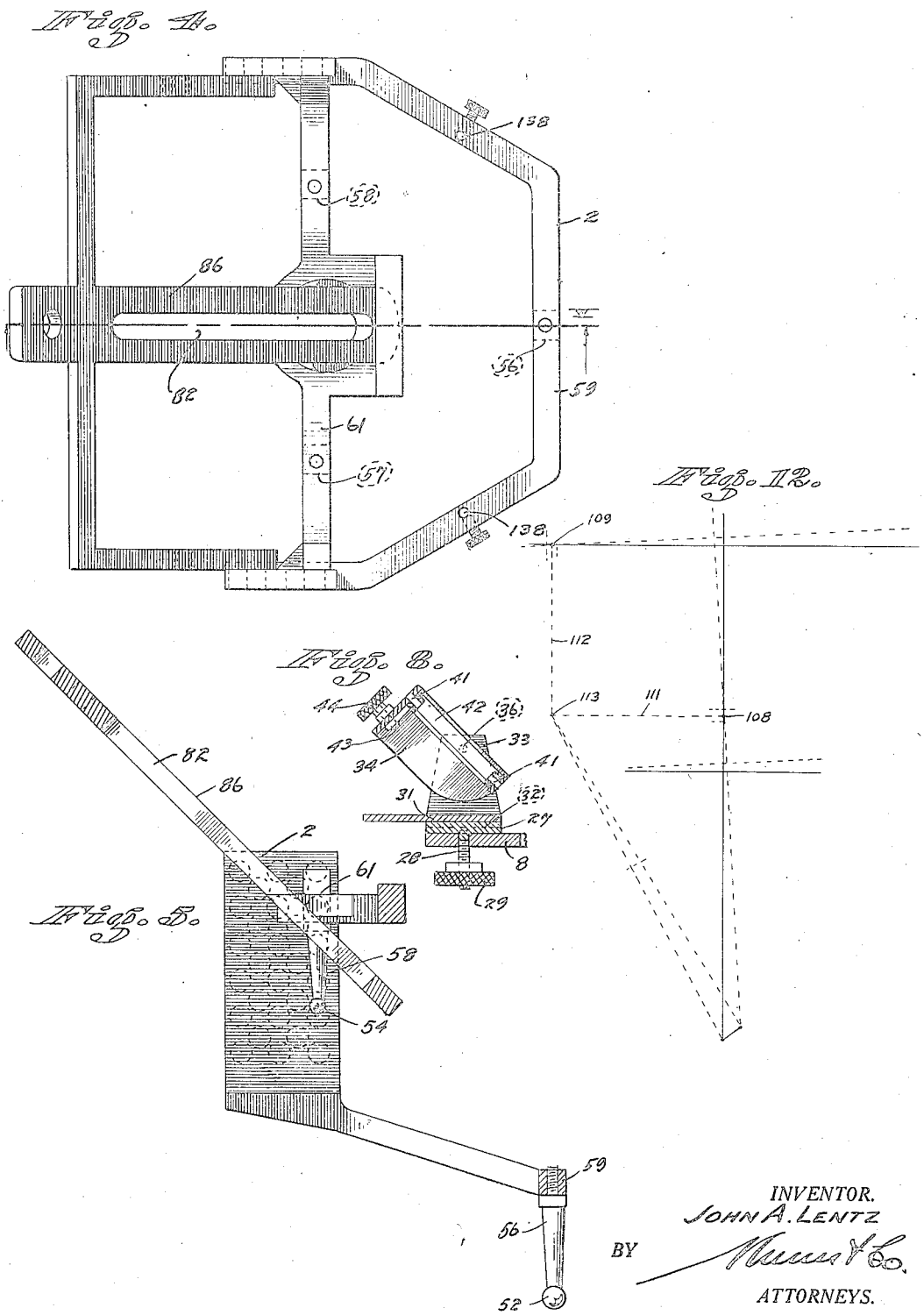

Aug. 31, 1926.
J. A. LENTZ
1,598,535
ADJUSTABLE PLANE ARTICULATOR
Filed April 22, 1924    5 Sheets-Sheet 5
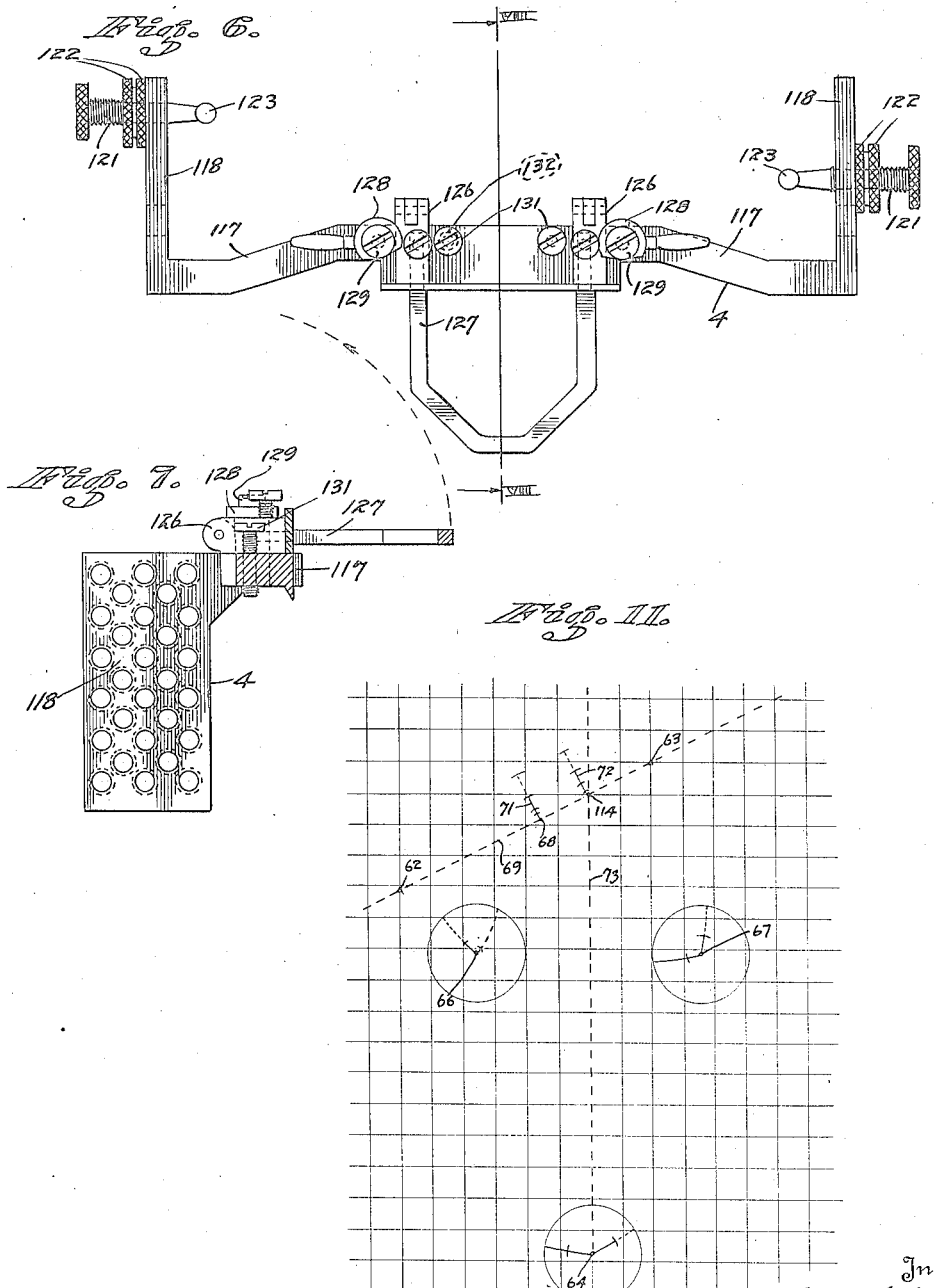
Inventor
JOHN A. LENTZ
By
Attorneys.

Patented Aug. 31, 1926.

1,598,535

UNITED STATES PATENT OFFICE.

JOHN A. LENTZ, OF PHOENIX, ARIZONA.

ADJUSTABLE-PLANE ARTICULATOR.

Application filed April 22, 1924. Serial No. 708,273.

The present invention relates to improvements in dental articulators, and has reference more particularly to that class of articulators known as anatomical articulators. The principal object of the invention is to provide an articulator in which mandibular movements of an individual patient are faithfully reproduced.

All mandibular movements may be reduced to four elementary movements or excursions of the mandible from central position. They are: first, the opening and closing movements; second, the right lateral movement; third, the left lateral movement; and fourth, the incisive movement; and their respective return movements. A true reproduction of these elementary movements allows of a reproduction of all the intermediate movements.

The opening movement is executed on the substantially horizontal opening axis, while the right and left lateral movements are executed on the right and left axes or points of rotation. All the axes of rotation are imaginary axes, and are not determined by clearly defined lines in the human head but may be found only by locating centers from peripheral movements actually taking place.

It is proposed in the present invention to provide a device in which the actual centers or axes of rotation can be readily ascertained and fixed for each individual human head.

Further objects of the invention incidental to the execution of the principal object will appear as the specification proceeds.

The preferred form of the invention is illustrated in the accompanying drawings, in which Figure 1 represents a front view of my device; Figure 2 a side view of the device; Figure 3 a vertical central section through the same; Figure 4 a detail plan view of the frame on which the model of the upper jaw or maxilla is supported; Figure 5 a vertical section through the latter frame taken along line V—V of Figure 4; Figure 6 a plan view of an axis finder supported on the upper frame; Figure 7 a vertical section through the same taken along line VII—VII of Figure 6; Figure 8 a vertical section through a lateral guide for the upper frame; Figure 9 a perspective view of a device used in connection with the articulator for the purpose of locating the right and left lateral centers of rotation; Figure 10 a device hereinafter described as the path finder; Figures 11 and 12 diagrammatic views illustrating the operation of my device. While I have shown only the preferred form of the invention, it should be understood that various changes or modifications may be made within the scope of the claims hereto attached without departing from the spirit of the invention.

The principal parts of my invention are the lower frame (1) and the upper frame (2), the lower frame supporting the model (3) of the mandible, and the upper frame supporting through the axis finder frame (4) the model (5) of the maxilla. While in the human head we usually consider the lower jaw as movable and the upper jaw as stationary, it is convenient in an articulator to mount the lower jaw stationary and the upper jaw movable relative thereto.

The lower frame consists of a suitable base (6) having two standards (7) rising therefrom with a platform (8) resting on the standards in parallel relation to the base. From the rear end of the platform rises at an angle of about forty-five degrees a slotted member (9) which will be hereinafter referred to as the mandibular guide. The plane of this guide constitutes the fundamental plane of the whole arrangement and will hereinafter be referred to as the horizontal plane, while the expression "vertical" will be used to signify any line or plane perpendicular to the plane of this mandibular guide. The latter guide has two arms (9') extending therefrom so as to form a T with the same; both arms and the mandibular guide being graduated beginning from the point of intersection. From the two arms project the braces (10) which latter are preferably disposed perpendicularly to the base, while a member (11) extending from the point of intersection of the two braces (10) is bent forwardly to form a support (12) for the springs (13), which latter are used to counterbalance the weight of the upper frame (2) so that the latter practically floats.

The springs (13) which are hooked below to the upper frame, are attached above to a bifurcated rod (14) threadedly received in a sleeve (16) riding in a slot (17) in the member (12) and supported by means of a head (18) with a nut (19) adapted to be screwed against the under face of the member (12) holding the whole arrangement in place. It will be seen that in this manner the tension of the springs can be adjusted to a nicety.

The platform (8) has the plate (21) secured thereto by means of screws (22), and the model of the lower jaw is fastened to the plate (21) by means of plaster of Paris.

The lower frame (1) serves as a support for the three guides (23), (24) and (26), the former being the incisal guide and the latter two being the right and left lateral guides respectively. The terms "right" and "left" in this description are used to represent the right and left side of the human head, so that in Figure 1 (24) represents the right lateral guide and (26) the left lateral guide.

The two lateral guides (24) and (26) are symmetrical in form and are mounted on the platform (8). One of them is shown in detail in Figure 8, from which it appears that a small plate (27) is secured to the platform (8) by means of the threaded rod (28) and the nut (29). The member (31) is rotatably anchored to the plate (27) by means of a tongue and groove arrangement (32) and has two standards (33) rising therefrom in spaced relation, between which is pivotally supported a frame (34) as shown at (36). The frame may be secured in any definite position by means of a screw (37) passing through an arched slot (38) in the frame and through a perforation in one of the standards (33) and adapted to tighten the frame upon the standard by means of a nut (39) (see Figure 3).

The frame (34) is substatially rectangular in form and supports on two alined pivots (41) two blades (42) which latter may be set at any desired angle to one another so as to form a trough by means of screws (43) riding in arched slots in the frame and tightened upon the same by means of milled heads (44).

To recapitulate, each of the two lateral guides (24) and (26) is thus mounted with freedom of revolving motion about the vertical pivot (28) and with freedom of revolving motion about the transverse pivot (36) while the two blades are mounted with freedom of revolving motion on the pivots (41), all the axes intersecting in a common center and means being provided in each case for setting revolving element at any desired point.

The incisal guide (23) is mounted on the base (6) in front of the two standards (7). The incisal guide is described in detail in my Patent No. 1,540,639 granted June 2, 1925, and is of substantially the same construction as the lateral guides but offers additional features in so far as two members (46) forming an inner circular opening (47) are slidably mounted on the blades (48) (corresponding to the blades (42)) with freedom of longitudinal sliding motion and that two sectors (49) are arranged within the circular opening in such a manner that they may be made to ride on the blades (48) with the members (46) without changing their angular relation, while at the same time their angular relation may be changed so that their front faces (51) may serve as a guide for lateral motions of the incisal ball, to be described hereinafter.

The upper frame (2) which is shown in detail in Figures 4 and 5 and which supports the model of the upper jaw through the axis finder frame described hereinafter, represents the movable element of my device. Practically each mandibular movement has a vertical and a horizontal component. Vertical movement of any body may be controled by the control of three points of the same, while movement in a horizontal plane may be controlled by means of two points. The general scheme of my device is to provide three guides— namely, the incisal guide (23) and the right and left guides (24) and (26) previously described, all of which are independently adjustable, for three fixed points on the upper frame, which three points are represented by the centers of the three balls (52), (53) and (54) disposed at the lower ends of the three legs (56), (57) and (58) depending from transverse members (59) and (61) of the upper frame, the balls all lying in the same plane. These three balls ride in the three troughs formed by the blades (42) of each guide, and the vertical element of each mandibular movement may be reproduced in the model by adjusting the blades of each trough and the angle and direction of each trough independently in accordance with the requirements of each case.

The horizontal element of each mandibular movement is taken care of by guiding two points of the upper frame. In this connection it should be remembered that lateral mandibular movements are not executed on a central vertical axis but are executed on two lateral axes or centers, which latter are seldom disposed symmetrically. An extreme case is diagrammatically illustrated in Figure 11, in which the point (62) represents the right lateral center and the point (63) the left lateral center. The points (64) (66) and (67) represent the centers of the three balls (52), (53) and (54). When a right lateral movement is made the mandible swings on the center (62), and when a left lateral movement is made the mandible swings on the left lateral center (63). It is evident that while the arcs described by the points (64), (66) and (67) representing the centers of the three balls diverge in the manner illustrated, the arcs described by any imaginary point (68) lying on the imaginary trans-center line (69) connecting the right and left lateral centers almost coincide and may be represented by a straight line (71) without causing any great error, as long as the arcs are comparatively short and the radius on which each arc is described is comparatively long.

This is substantially true, within reasonable limits, for any straight line drawn perpendicular to the trans-center line (69) so that the straight line (72) passing through the intersection of the line (69) with the median line (73) of the whole apparatus and drawn perpendicular to the line (69) may be considered a guide line for the rear end of the upper frame for both right and left lateral movements.

The straight line (72) is represented in my device by the rod (74) mounted in a plane parallel to that of the mandibular guide (9) with freedom of sliding vertical motion and fastenably adjustable longitudinally and also rotatably on a vertical axis. The rod is bent upon itself as shown at (76) with the turned over portion (77) terminating, about midway of the rod (74), in a transverse member (78) of square cross-section slidably received in a sleeve (79) which latter is rotatably and fastenably held in a second sleeve (81) slidable in a slot (82) in the mandibular guide (9) and adapted to be fastened by means of a nut (83). The sleeve (81) is held against rotation in the slot (82) and is graduated as shown at (84) so that the angular position of the rod (74) relative to the mandibular guide may be readily ascertained.

The upper frame has secured thereon a slotted guide member (86) disposed to be normally parallel to the mandibular guide (9). In this member (86) is supported with freedom of longitudinal adjustment a threaded sleeve (87) adapted to be fastened at any desired point by means of a head (88) and to rotatably receive on the inside thereof the stud (89) of one element (91) of a universal joint, the stud being held in place by means of a screw (92). The second element (93) of the universal joint is a sleeve adapted to slidably and rotatably receive the rod (74) previously referred to, with a shoulder (94) limiting the motion of the sleeve relative to the rod (74). When the universal joint is fastened, its center lies in the same plane with the centers of the three balls (52), (53) and (54) and the four points form the four corners of a kite, the line connecting the center of the ball (52) with the center of the universal joint being the axis of symmetry.

Sliding motion of the sleeve (93) on the rod (74) in connection with the free vertical play of the rod (78) in the sleeve (79) may represent right and left lateral mandibular motion on the lateral centers as well as incisive movement (which is in reality a combination of the two) or any intermediate movements.

While in this manner the rod (74) guides the rear end of the upper frame, the front end of the same is guided by the two sectors (49), along the faces (51) of which, or within the enclosed area of which, the incisal ball (52) may travel. The weight of the upper frame is taken up to the extent desired by the springs (13) previously described.

To find the proper location of the rod (74) or the straight line (72) of Figure 11 I use the instrument (96) shown in Figure 9. The mandibular guide (9) is formed with two lateral extending arms (9') as shown in Figure 1, and the member (96) is made to correspond to the form of the mandibular guide (9) with its two arms so that when properly positioned the member (96) will cover the T-shaped arrangement of the mandibular guide.

The member (96) has an extension (97) which may be clamped between a shoulder (98) and the nut (99) on a rod (101) sliding freely vertically in its sleeve but without rotation therein and terminating in a fork (102) forming one element of a universal joint, the other element being furnished by the lower end of a second rod (104) adapted to be clamped in a hole at the back of the member (86) by means of the shoulder (103) and the nut (107). When in working position, the center of this universal joint is preferably in the same plane as the centers of the three maxillary balls. The member (96) may be temporarily substituted for the rod (74) and the sleeve (93) sliding thereon and the supporting arrangements of both elements by removing the latter or sliding them forward out of interference.

To find the location for the rod (74) or the line (72) of Figure 11, the operator may proceed as follows: After removal of the rod (74) and the elements cooperating therewith, the member (96), which may be called the center-finder, is secured in place so that the T of the center-finder overlies the T of the mandibular guide. The terminating position of a lateral movement of the upper frame corresponding to a lateral movement of the patient's jaw is reproduced by introducing between the models a corresponding bite, which causes the T-shaped center-finder to assume a position relative to the mandibular guide as indicated in dotted lines in Figure 12. The stem of the T intersects the mandibular guide near but not at (108), while the cross bar of the center-finder intersects the corresponding arm of the mandibular guide near but not at (109). The readings on the two registering scales will indicate the extent of shifting that has been done, and if perpendiculars (111) and (112) are drawn from the middles (108) and (109) of the arcs or cords of the motion, they will meet at (113) which latter point therefore may be regarded as the center of the lateral motion.

In a similar manner a corresponding center may be found for a lateral motion in the opposite direction, so that we now have the two points (62) and (63) of Figure 11. These points may be readily located by the use of a chart such as shown in Figure 11, in which the center line coincides with the median line (73) and the graduations correspond to the graduations on the mandibular guide and the center-finder. After the two points (62) and (63) have been located they may be connected by the line (69) which intersects the median line (73) at (114). The line (72) is a perpendicular from the point (114) of the line (69).

Having thus established the position of the various points, the operator returns to the articulator, removes the center-finder and inserts the rod (74) in such a manner that the vertical extension (78) occupies the point (114) of Figure 11. Having secured the rod by means of the nut (83), he turns the same to the angle formed between the straight line (72) in Figure 11 and the median line, which he can do with the aid of the graduation on the sleeve (81), whereupon the center line of the rod (74) is a true reproduction of the straight line (72) of Figure 11. The sleeve (93) may then be slid on the rod (74) and secured in the guide (86) in such a manner that when the whole device is in a central position the center line of the screw (92) coincides with the center line of the square rod (78).

The upper frame, which is thus guided vertically by the blades of the incisal and lateral guides and laterally by the sectors (49) on the incisal guide and the rod (74), has the axis-finder (4) shown in detail in Figures 6 and 7 secured thereon. This device is called an axis-finder because it assists in locating the horizontal axis on which opening and closing movements are executed. It comprises a yoke shaped member (117), the two arms of which have plates (118) depending therefrom, which latter plates may be placed in confronting relation with two registering plates (119) formed on the upper frame.

The two plates (118) of the axis-finder are provided with a large plurality of perforations adapted to threadedly receive a screw (121) which may be locked in any desired position by means of two nuts (122). The screw terminates in a ball (123) which may be made to engage with any one of a plurality of recesses in the plates (119), which latter recesses are arranged to register with the perforations in the plates (118) when the axis-finder is in its normal or closing position.

A second screw (124) is used on either side for the purpose of fixing the position of the axis-finder relative to the upper frame. On the axis-finder is hingedly supported as shown at (126) a frame (127) to which the model of the upper jaw may be attached as shown in Figure 2. The frame (127) may be swung upwardly on the hinges (126) but may be locked by means of the shoulders (128) on sleeves rotating on the members (129). The transverse member (117) of the axis-finder is held in spaced relation to the transverse member (61) of the upper frame by means of set screws (131), the motion of one of which may be limited by means of a shoulder, (132).

To find the horizontal axis of opening movements for a particular patient, a wax bite is taken of the open mouth and inserted between the two jaws of the model. To accommodate the wax bite the upper jaw has to be moved, and the plates (118) will change their position relative to the plates (119) on the upper frame. Since all the plates are disposed in the general region where the opening axis may be expected to be, there will be one perforation on either side that does not change its relative position to one of the recesses in the plate (119), and this perforation necessarily presents the opening axis, that is, the only line that remains stationary during the execution of a rotary movement.

After the perforation that has not changed its relative position has been located, the screw (121) is introduced through said perforation until the ball (123) engages with the registering recess. If this is done on both sides independently, the centers of the two balls (123) define the horizontal axis for opening movements.

As a means for determining the path of any point in either jaw, the path-finder illustrated in Figure 10 is used. In one form it consists of a rod (133) having a transverse rod (134) pointed at one end and bent and pointed at the other end secured thereto by means of a holding member (136) allowing the rod (134) to slide therein, with a set screw (137) serving to adjust the rod (134) to any desired position. The rod (133) may be inserted in suitable sockets (138) provided in various places and one of its points adjusted to represent any point, such as a future tooth cusp on the frame to which the path-finder is attached. If opposite this, on the opposing frame, a modelling compound is mounted, movement of the articulator will inscribe in this modelling compound the path of the point selected for any movement executed.

For the operation of the whole device it is necessary that wax bites be taken of various positions of the mouth of the patient.

First a central bite is introduced between the models and the incisal guide (23) and the two lateral guides (24) and (26) are adjusted so that the balls (52), (53) and (54) occupy a central position in the troughs formed by the said guides and are in contact with the same and the center of each ball is coincident with the axial center of the corresponding guide. The incisal ball (52) is also in contact with the faces (51) of the sectors (49), while the rear guide (74) is temporarily removed and the center-finder substituted. An incisive bite is substituted, which will change the position of the upper frame so that the three balls move upwardly and rearwardly, perhaps in a straight backward movement and perhaps at a slight angle. The three troughs are now swung on their horizontal axis and possibly on their vertical axes and fastened so that the three balls are again in contact with the central portion of the trough at a higher point than in the first position.

Next a right lateral bite is inserted and the left blades of the incisal, right and left guides and the left sector (49) of the incisal guide, which have been previously freed to avoid interference with the positioning of the balls, are brought in contact with the respective balls and fastened. At the same time the center of the right lateral movement, or the point (62) of Figure 11, is found by means of the center-finder illustrated in Figure 9 in the manner described before. A left bite is substituted and the right blades of the three guides (23), (24) and (26) and the right sector (49) are adjusted, while the center of the movement, or the point (63) of Figure 11, is found by means of the center-finder.

The two points (62) and (63) are marked on a chart in the manner described, whereby the point (114) is located. The center-finder is then removed and the arrangement for holding the rod (74) substituted, so that the square rod (78) coincides with the point (114) and the rod (74) forms an angle with the median line equal to the angle formed by the straight line (72) with the median line. The sleeve (93) is then telescoped on the rod (74) and secured in place.

By means of the blades of the three guides (23), (24) and (26) we thus have a vertical guide for all movements, while by means of the horizontal sectors (49) and the rear guide (74) we have a horizontal guide for all movements in which contact is maintained.

To determine the opening axis the screws (121) and (124) are removed, whereupon an open central bite is introduced. The perforation on either side which has not changed its position relative to its registering recess is marked, and after the removal of the bite and the return of the axis-finder frame to normal, the screws (121) are introduced, establishing the opening axis and allowing of the faithful reproduction of opening and closing movements. To lock the axis-finder frame the auxiliary screw (124) may be used.

I claim:

1. Means for reproducing mandibular movements in a model comprising means for vertically guiding a plurality of points of the same and means for horizontally guiding a plurality of points of the same, none of the guided points bearing a definite positional relation to the condyles or centers of rotation and the means for guiding each point being independently adjustable.

2. Means for reproducing mandibular movements in a model comprising means for vertically guiding a plurality of points of the same and means for horizontally guiding a plurality of points of the same, all the guided points lying in a single plane and none of them bearing a definite positional relation to the condyles or centers of rotation and the means for guiding the points being independently adjustable.

3. Means for reproducing mandibular movements in a model comprising means for guiding four points of the same arranged in kite formation and including means for guiding three neighboring points vertically, and means for guiding the fourth point and its diagonal opposite horizontally.

4. Means for reproducing mandibular movements in a model comprising means for guiding four points of the same arranged in kite formation and including means for guiding three neighboring points vertically, and means for guiding the fourth point and its diagonal opposite horizontally, all the guided points lying in the same plane.

5. Means for reproducing mandibular movements in a model comprising means for guiding four points of the same arranged in kite formation and including means for guiding three neighboring points vertically, and means for guiding the fourth point and its diagonal opposite horizontally, the means for guiding each point being independently adjustable.

6. In a dental articulator, in means for reproducing mandibular movements in a model, means for determining the position of the two lateral axes of rotation of said movements comprising a stationary element, a movable symmetrical element fixed relative to the model superimposed on the stationary element allowing arcs of the rotation to be fixed by executing a mandibular movement whereby the axis of rotation can be found.

7. In a dental articulator, in means for reproducing mandibular movements in a model, means for determining the position of the two lateral axes of rotation of said movements comprising a stationary T-shaped element, a movable symmetrical element fixed relative to the model superimposed on the stationary element allowing arcs of rotation to be fixed by executing a mandibular movement whereby the axis of rotation may be found.

8. In a dental articulator, a stationary frame, a movable frame supported thereover having three legs extending therefrom, and independent means for guiding each leg individually, each means comprising two blades hinged together to form a trough.

9. In a dental articulator, a stationary frame, a movable frame supported thereover having three legs extending therefrom, and independent means for guiding each leg individually comprising two blades hinged together to form a trough, with means for individually adjusting the angularity of each blade.

10. In a dental articulator, a stationary frame, a movable frame supported thereover having three legs extending therefrom, and independent means for guiding each leg individually comprising two blades hinged together to form a trough, with means for individually adjusting the angularity of each blade and means for adjusting the angularity of the trough as a unit relative to a horizontal plane.

11. In a dental articulator, a stationary frame, a movable frame supported thereover having three legs extending therefrom, and independent means for guiding each leg individually comprising two blades hinged together to form a trough, with means for individually adjusting the angularity of each blade and with means for revolving each trough in its horizontal plane.

12. In a dental articulator, a stationary frame, a movable frame supported thereover having three legs extending therefrom, and independent means for guiding each leg individually comprising two blades hinged together to form a trough, with means for individually adjusting the angularity of each blade, means for adjusting the angularity of the trough as a unit relative to a horizontal plane and with means for revolving each trough in its horizontal plane.

13. In a dental articulator, a stationary frame, a movable frame supported thereover having a front leg and two spaced rear legs extending therefrom, independent means for guiding each leg individually comprising two blades hinged together to form a trough and means on the front trough for guiding the front leg laterally.

14. In a dental articulator, a stationary frame, a movable frame supported thereover having a front leg and two spaced rear legs extending therefrom, independent means for guiding each leg individually comprising two blades hinged together to form a trough and sectors revolvable on the blades of the front trough for guiding the front leg laterally.

15. In an articulator of the character described, a frame adapted to receive a model having three supporting members operatively arranged around a model, means engaged by the supporting members for guiding the same and a horizontal guide member slidably engaging a rear element of the frame, the guide member being supported with freedom of vertical sliding motion.

16. In an articulator of the character described, a frame adapted to receive a model having three supporting members operatively arranged around a model, means engaged by the supporting members for guiding the same and a horizontal guide member slidably engaging a rear element of the frame, the guide member having means associated therewith for adjusting its angularity relative to a vertical plane.

17. In an articulator of the character described, a frame adapted to receive a model having three supporting members operatively arranged around a model, means engaged by the supporting members for guiding the same and a horizontal guide member slidably engaging a rear element of the frame, the guide member being supported with freedom of vertcial sliding motion and having means associated therewith for adjusting its angularity relative to a vertical plane.

18. In a dental articulator, means for determining the opening axis of mandibular movements on a model consisting of a stationary and a movable member representing the mandible and the maxillæ respectively, comprising an element associated with the movable member having a plurality of indicating marks thereon in the region of the opening axis and a stationary element having a plurality of normally registering indicating marks, with corresponding indicating marks remaining in registry during the execution of a mandibular movement locating the axis on which the movement has been executed.

19. In a dental articulator, means for determining the opening axis of mandibular movements on a model consisting of a stationary and a movable member representing the mandible and the maxillæ respectively, comprising a pair of parallel plates on the movable member on opposite sides thereof, each plate formed with a plurality of perforations in the assumed region of the opening axis, and stationary plates confronting the former plates having corresponding normally registering recesses therein, with corresponding perforations and recesses remaining in registry during the execution of a mandibular movement locating the axis on which the movement has been executed.

JOHN A. LENTZ.